United States Patent [19]
Payne

[11] 4,024,409
[45] May 17, 1977

[54] AEOLIAN WINDMILL

[76] Inventor: Peter R. Payne, Rte. 5, Box 282, Annapolis, Md. 21401

[22] Filed: Jan. 7, 1975

[21] Appl. No.: 539,142

[52] U.S. Cl. .................... 290/55; 416/81; 416/37; 417/334
[51] Int. Cl.² .............................. F03D 5/06
[58] Field of Search ............ 290/1, 42, 43, 44, 53, 390/54; 416/80, 81, 82, 83, 90, 8; 417/334

[56] References Cited
UNITED STATES PATENTS

| 474,839 | 5/1892 | Lamphear | 416/80 |
| 640,003 | 12/1899 | Landon | 416/81 |
| 717,110 | 12/1902 | McGregor | 416/80 |
| 1,490,787 | 4/1924 | Thornycroft | 416/80 |
| 2,465,285 | 3/1949 | Schwickerath | 416/80 |
| 3,584,811 | 6/1971 | Leavy | 416/90 |

FOREIGN PATENTS OR APPLICATIONS

| 433,513 | 9/1926 | Germany | 416/8 |
| 211,916 | 2/1941 | Switzerland | 416/83 |

*Primary Examiner*—Robert K. Schaefer
*Assistant Examiner*—John W. Redman
*Attorney, Agent, or Firm*—Sughrue, Rothwell, Mion, Zinn & Macpeak

[57] ABSTRACT

A system is disclosed which utilizes a member which oscillates in response to movement of a fluid past it and a means for utilizing the energy generated by the oscillation. In one embodiment the oscillating member is a cable utilizing wind or water as generator or pump. In a second embodiment, the oscillating member is an airfoil having either pitch control or active circulation control.

7 Claims, 11 Drawing Figures

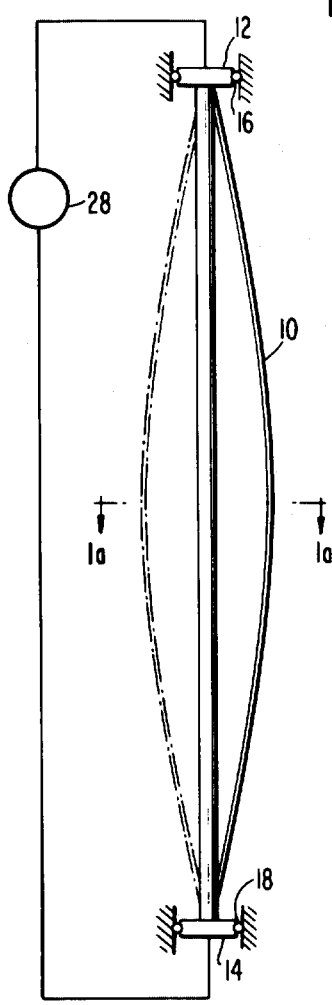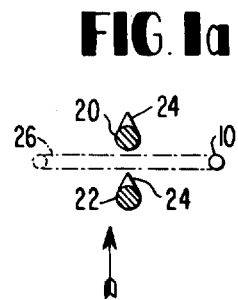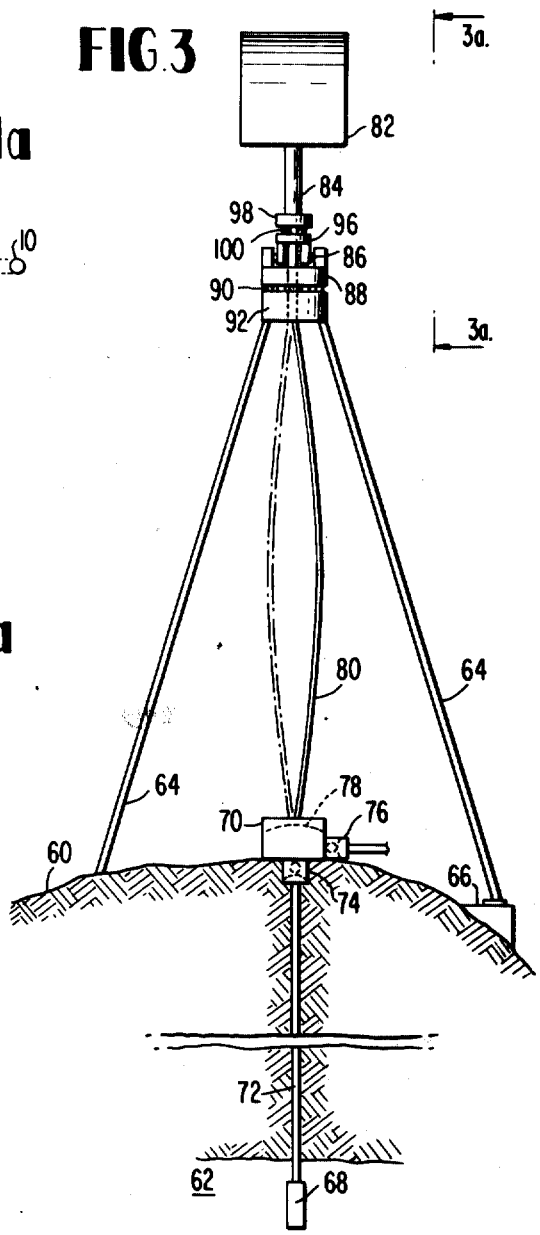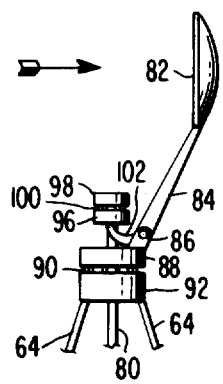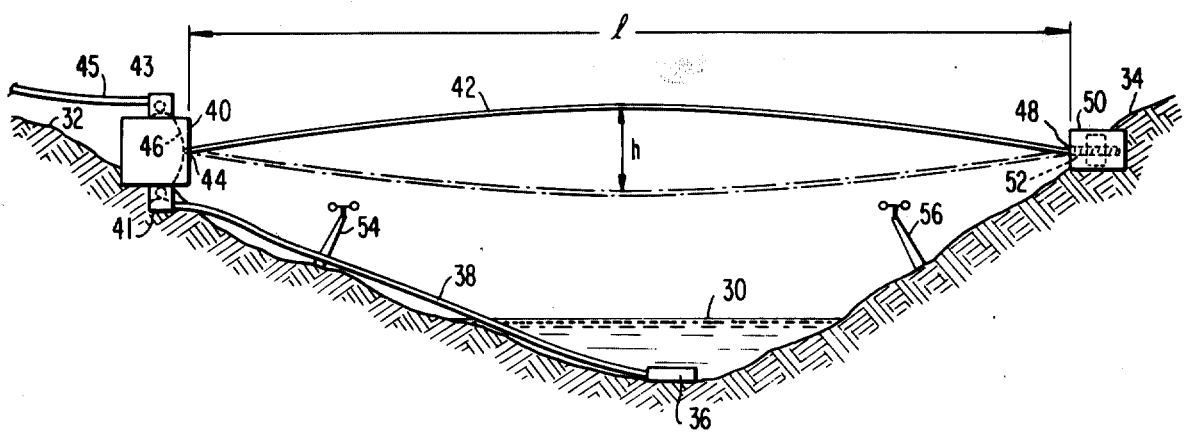

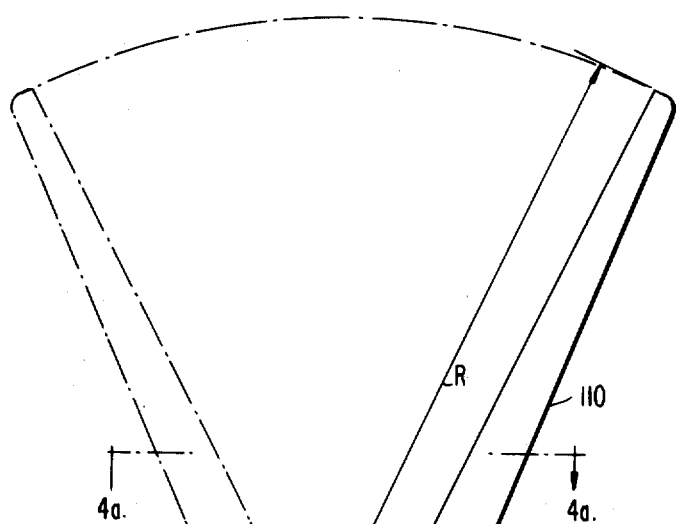
FIG.4
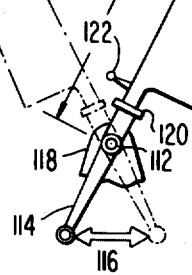
FIG.4a
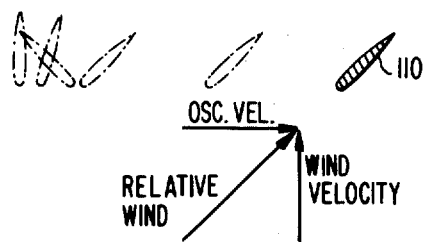
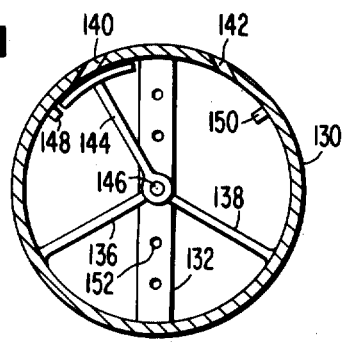
FIG.5a
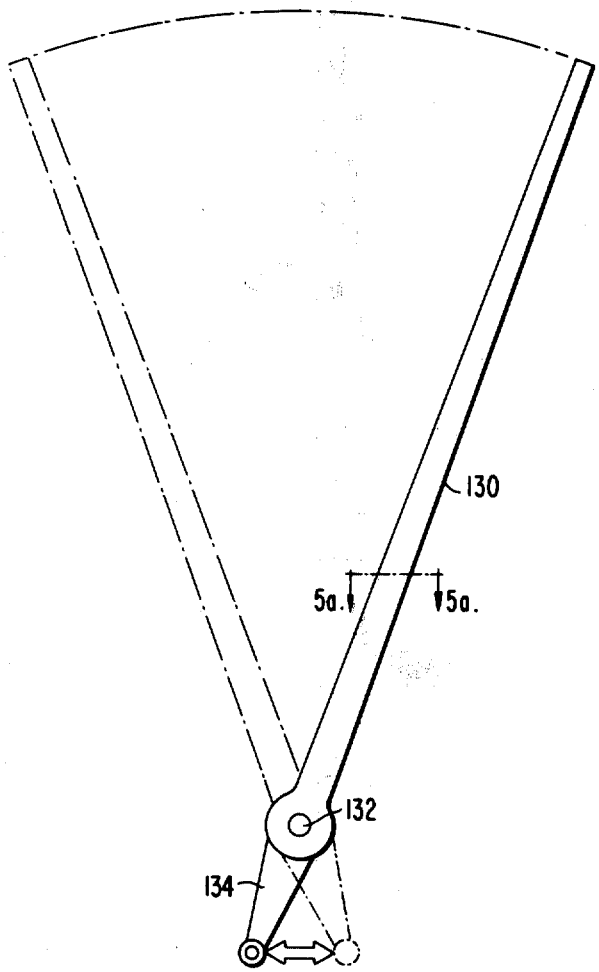
FIG.5

AEOLIAN WINDMILL

BACKGROUND OF THE INVENTION

1. Field of the Invention

This invention relates to a class of devices which oscillate in response to a moving fluid to extract useful energy.

2. Prior Art

Windmills are the most commonly known devices utilizing the motion of a fluid, in that case air, to cause a rotary motion of the device in the production of useful energy. In the prior art, it is apparent that fixed site, horizontal or vertical axis windmills have received most consideration. The design of such steady state windmills tends to lead to complex and expensive structures, difficult to build and maintain. The regime of use, with relatively high centrifugal forces, requiring transmission of motions, gearboxes and rotational speed controls are contributing factors in the generally unsatisfactory economics of scale of these devices. The mass produced Hallady-Perry windmill of the 1920's and 1930's, once a common sight in rural areas has, today, been replaced by almost total electrification. The prior art is replete with devices which attempt to improve the efficiency and reduce costs of such windmill designs.

Today, with an increased public awareness of energy problems, experiments in alternative forms of energy generation have renewed interest in windmills. However, proposed devices, typified by interest on the part of NASA, *Newsweek*, Mar. 29, 1974, interview with R. D. Ginter in "Business & Finance," return to rotary windmill types.

In a more generalized sense, it is apparent that a variety of alternatives exist for the use of fluid motion in the generation of useful energy. Devices may be catagorized by the type of motion utilized, rotary in the case of the conventional windmill, linear in the case of a sailboat or oscillatory in the case of the invention described herein. Additionally, the type of mounting, fixed structurally or self-erecting provides functional breakdown in which to accurately classify these devices. While not strictly a windmill, the sailboat is a well known type of wind utilizing device by which to demonstrate the classification. Sailboats involve the generation of linear motion, movement of the vessel, and the wind responsive devices may be either structurally mounted with sails on masts and standing rigging or self-erecting in the case of spinnakers which tend to be restained by wires or guys and hold themselves in place in response to aerodynamic forces generated by the interaction of sail shape and the relative wind. The wide variety of possible devices existing within such a matrix reveals that many configurations are simpler than conventional rotary motion structurally mounted windmills and some extract more energy per unit weight. Additionaly, there are dynamic constraints on windmill efficiency. Generally, the physics of fluid flow, for a variety of well known reasons limits the magnitude of the force coefficient developed parallel to or normal to the relative fluid direction. This force coefficient is the lift coefficient for horizontal axis windmills and the drag coefficient differential for some vertical axis designs. Although the efficiency of the system increases with increases in force coefficient, the limiting range is in the order of 2.0 or less. These limiting factors, expense, size and dynamic efficiency have stimulated interest in the third type of fluid responsive device, the oscillatory system.

SUMMARY OF THE INVENTION

This invention relates to a class of windmills which have an oscillatory or transient motion, preferably involving a type of resonance with a concommitant interchange between kinetic and potential energy. The power extracted from such system may be considered as a damping term. Several simplistic examples are known, for example the stall flutter of a street sign in a strong wind resulting in an oscillatory twisting motion of the sign about its support post and the singing or "aeolian tones" in the wires of power cables. These latter oscillations are manifestations of the same phenomenon; mechanical resonance with the Strouhal shedding frequency and this invention utilizes such oscillatory motion to produce a new class of wind-driven-power generating instruments.

Generally, when a fluid flows past a circular wire or cylinder, it can excite a lateral oscillation of which the above mentioned Aeolian tones are a familiar example. This oscillating side force is due to the separation of the boundary layer from one side of the body, and then from the other in a regular manner. This oscillatory tripping of the boundary layer was first described by Strouhal ["Ueber eine besondere Art der Tonnerregun." Weidemann's Annzien der Physic and Chemie, neue Folge, Vand V, pp. 215–251 (1878)]. If $n$ represents the frequency of oscillation in Hertz, $\delta$ the cylinder diameter and $u$ the fluid velocity, then $$S(\text{Strouhal number}) = \frac{n\delta}{u} = \text{constant}$$

For a circular cylinder, Strouhal found $S \approx 0.2$ which has been verified in the Reynolds number range of 100 to $3 \times 10^6$.

When a cylinder oscillates laterally in resonance with the Strouhal forcing frequency, the lateral exciting forces are magnified by an order of magnitude [See: Bishop and Hassan, "The Lift and Drag Forces on a Circular Cylinder Oscillating in a Flowing Fluid." Proceedings of the Royal Society, London, Series A, Vol. 277, pp. 51–74 (1964)]and act approximately 90° out of phase with the motion so that useful power can be extracted from the system. The lifting coefficients of such motion ($C_{CL}$) can be as high as 10, or even 100, in some cases.

Accordingly, it is an object of this invention to utilize oscillatory motion of structures to generate usable power.

It is another object of this invention to provide a class of oscillatory windmills having greater efficiency than conventional rotary windmills.

It is a further object of this invention to provide an oscillatory windmill having better wind energy economics and economics of scale over prior art devices.

Other objects and features of the invention will become apparent from a study of the following detailed description of several embodiments.

BRIEF DESCRIPTION OF THE DRAWINGS

FIG. 1 is a schematic view of an Aeolian Generator made in accordance with this invention;

FIG. 1a is a partial top view of the FIG. 1 device showing the path of oscillatory movement.

FIG. 2 is a schematic view of an elementary pump using the teachings of this invention;

FIG. 3 is a schematic view of an omni-directional wind pump;

FIG. 3a is a side view of the sail portion of the device of FIG. 3;

FIG. 4 is a side view of a unisail reciprocating windmill embodiment in accordance with this invention;

FIG. 4a is a sectional view along line A—A of FIG. 4 showing blade motion;

FIG. 5 is a side view of an oscillating cylinder windmill using BGTE circulation control;

FIG. 5a is a section of the blade of FIG. 5 taken along line 52;

DESCRIPTION OF THE PREFERRED EMBODIMENT

Figure 6:
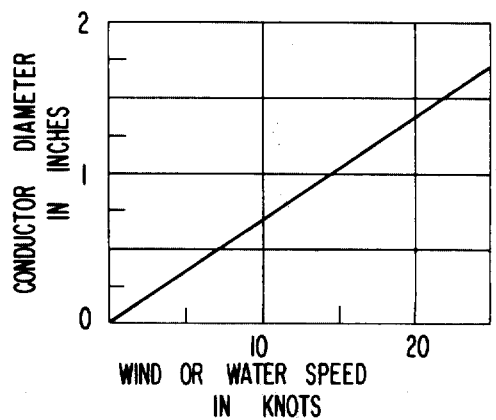
FIG. 6 is a graph of nominal conductor viameter requred for 60 Hertz Resonance in a system as shown in FIG. 1.

Referring now to FIG. 1, there is shown a first preferred embodiment of this invention, an aeolian A.C. generator. An oscillating conductor 10 is anchored between two end points 12, 14, fixed a set distance apart, but journaled for pivotal movement by pivots 16, 18. A series of permanent magnets 20, 22, as better shown in FIG. 1a are disposed such that number 12 oscllates between the magnets. Attached to each magnet is a trailing edge 24 to maintain the magnets in an orientation parallel to the relative wind. As shown by the dotted line 26, the oscillation of the conductor 10 is normal to the relative wind and the alignment of the magnets. A utilization device 28 is schematically shown as a receiver of the generated energy. With the magnetic field provided by high coercive force permanent magnets, such an approach offers an alternative of low cost A. C. power generation from either the wind or in a hydro-electric format.

If the boundary layer is laminar, the diameter of the conductor 10 becomes important vis-a-vis the Strouhal number. The conductor diameter is:

$$\delta = \frac{S \, u \, \sin\phi}{n}$$

where $\phi$ is the angle the conductor makes to the fluid flow. For purposes of analysis of the FIG. 1 embodiment, it can be assumed that a unit length of conductor has a motion:

$$x = X_o \cos\Omega t$$

where $\Omega$ is $2\pi n$ and $X_o$ is the amplitude of motion. The fluid dynamic side force on the unit length is:

$$F = \tfrac{1}{2} \rho \, u^2 \sin^2\phi \, \delta \, C_{Lo} \sin\Omega t$$

where $\rho$ is the density of the fluid and $C_{Lo}$ is the lift coefficent amplitude. The average power potentially available from one cycle of oscillation is:

$$P = \frac{1}{t} \int_0^t F \frac{dx}{dt} \, t = \frac{1}{2} \rho u^3 \sin^2\phi \delta C_{Lo} X_o \frac{1}{2\pi} \int_0^{2\pi} \sin^2\Omega t \, d(\Omega t)$$

$$= \frac{1}{4} \rho u^3 \sin^2\phi C_{Lo} \delta X_o n$$

however, since $$\delta = \frac{S \, u \, \sin\phi}{n},$$

$$P = \frac{1}{2} \rho u^3 \sin^3\phi C_{Lo} X_o S$$

Hence, potential power is independent of frequency. If unit length of cable oscillates at amplitude $X_o$, the kinetic energy in the fluid embraced by the sweep is:

$$\frac{1}{2} m u^2 = \frac{1}{2} \, 2 X_o \sin\phi \rho u^3 \, \frac{\text{ft-lbs}}{\text{sec}}$$

It is possible to express the efficiency of such a unit in terms used by Glauert, "Windmills and Fans" in *Aerodynamic Theory*, chapter 11 11, Vol. *IV* Dover (1963) in the arbitrary definition $$\eta = \frac{C_{Lo} S}{2} \sin^2\phi$$

which is conventionally used for rotary windmills. In the case of rotary windmills Glauert's equation gives an anomalous result, $\eta = 16/27$ because he neglects the face that the tube of air which actually passes through the disc has a smaller diameter that the disc when it is upstream. In the case of the oscillatory system of FIG. 1, when the device is normal to the flow($\sin\phi=1$), $S = 0.2$ and $C_{Lo} = 10$, the result is $\eta = 1$, as we would expect.

As shown in this analysis, the frequency of oscillation $n$ can be controlled by the sweep-back angle $\phi$ or by the velocity of the fluid. Accordingly, in non-steady state conditions of varying wind or water speed, the device of FIG. 1, may be pivoted or tilted such that the sweep-angle is changed to hold $n$ constant. Alternatively, an array may be mounted inside a duct with the velocity controlled by shutters at the duct entry or exit.

Figure 7:
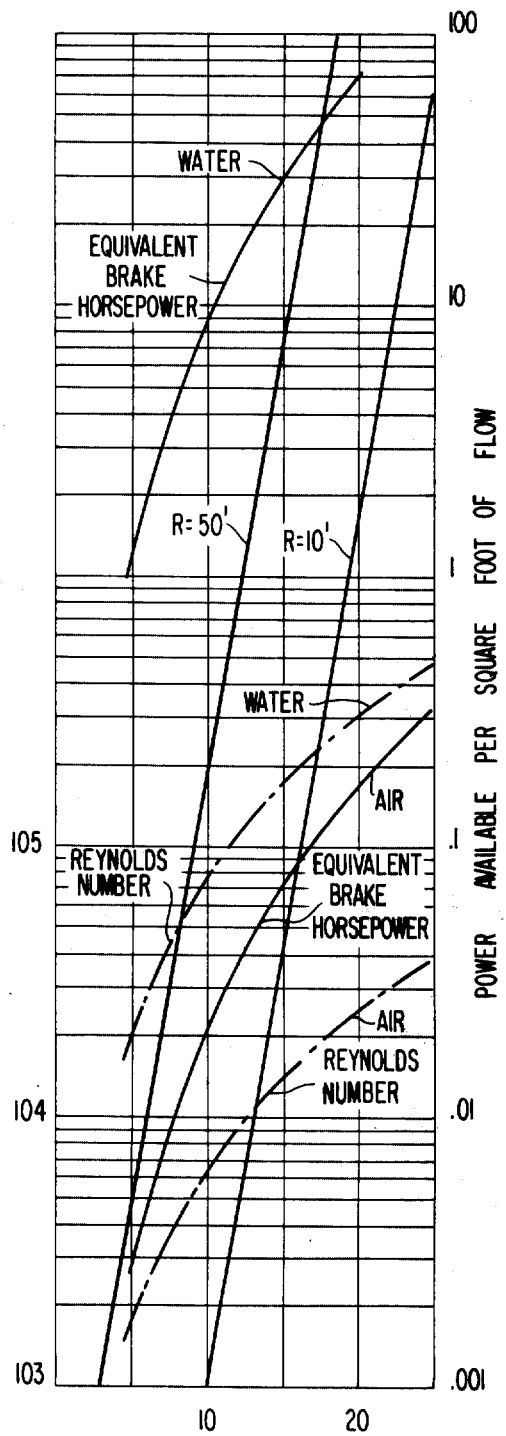
FIG. 7 is a graph of Reynolds number for a 60 Hertz System and Power Available as a function of velocity.

Referring briefly to FIGS. 6–7 two graphs are presented to give preliminary sizing information of the FIG. 1 embodiment, for use when the boundary layer is laminar. FIG. 6 is a plot of wind or water speed in knots, on the X-axis versus conductor diameter. The straight line plot represents the nomial conductor diameter required for 60 Hertz resonance when $\phi = 90°$. FIG. 7 is a plot of wind or water speed in knots on the X-axis and a logarithmic plot vertically of Reynolds Number and Power available per Square Foot of Flow. As in the case of FIG. 6, the plots are for $\phi = 90°$ and a 60 Hertz system. The solid lines represent equivalent brake horsepower available per square foot of flow and the broken lines the Reynolds number. The higher Reynolds Number for the water plot is a function of reduced fluid kinematic viscosity since to be comparable the scale dynamics must be identical for the other constants imposed on the system. Although higher power is theoretically available in water, the use in such a medium imposes design constraints not found in wind driven systems. Optimization then becomes a function of environment vis-a-vis a given desired output.

The use of the basic device, shown in FIG. 1, is however, not limited to the generation of electrical energy. FIGS. 2 and 3 show an alternative use, in pumping systems. Turning first to FIG. 2, an elementary pumping system for use in streams or rivers is shown. As shown, looking down the stream 30, disposed across and on opposite banks 32, 34 is the pumping system. Below the water level is an intake 26 having sufficient screens or baffles to remove foreign particulate matter and input line 38 running from the intake 36 to a diaphragm pump, shown schematically at 40. The pump has an input connection 41, output lines 43 and output line 45. A cable 42 is disposed across the stream 30 with one end 44 operable connected to the diaphragm 46 of the pump 40 and the other end 48 coupled to a tensioning device 50. The tensioning device 50 may characteristically be a jack screw 52 or the other mechanical device to vary the tension on the cable 42. A series of wind sensors 54, 56, conventionally cup anemometers are utilized to average the wind velocity and provide an input to the tensioning device to appropriately vary the tension of the cable 42 in response to changes in velocity. The anenometers may either be hard wired directly into the tensioning device or coupled by radio link. The particular couple is not crucial and may vary depending on factors such as terrain or distance.

In response to wind velocity, the cable 42 will oscillate an amplitude $h/2$ and as shown, for use in the first mode of resonance the pump stroke will be approximately $8/3\ h^2/l$. Although fixed, the cable may not be able to maintain a true 90° orientation to the wind, however, the study of wind motion indicates that generally, banks and other topography associated with streams or rivers tends to channel or funnel wind in a direction parallel to the water flow. Hence, by proper location of the sytem an orientation substantially normal to wind direction in prevailing conditions may be obtained. The pumping action of the diaphragm 46 in response to movement of the cable 42 is conventional to all pumping systems and need not be discussed in detail.

An omni-directional system employing the oscillating cable principle is shown in FIG. 3 located on the surface 60 above a subterranean supply of water 62, the system is erected on a series of legs 64 in a level orientation with the air of leveling device 66. An intake 68 is disposed in the water supply with suitable filters and is coupled to a diaphragm pump 70 by connecting hose 72. The pump 70 has inlet and outlet connections 74, 76 with the diaphragm 78 operably coupled to one end of the oscillating conducting 80. The top end of the connector is attached to a level mounted sail 82 which is used to adjust tension in response to variations in wind velocity. As shown in FIG. 3 and FIG. 3a, the sail 82 has an arm 84 journaled for rotation about a pin 86 which is set in base 88. Base 88 is journaled for rotation by bearings 90 between base 88 and housing 92 which holds legs 64. The cable 80 passes inside housing 92 to a support 94 which has a lower member 96 and an upper member 98, members 96 and 98 separated by a bearing 100. A flange 102 is disposed between arm 84 and lower member 96 such that movement of the sail 82 will be reflected by an upward or downward movement of numbers 96 and 98 to thereby vary the tension of the cable which is fixed to member 98. The bearing 100 is provided to eliminate rotation of the cable and accordingly in response to variations in wind direction, movement of the sail 82 will cause support 88 and lower member 96 to rotate while the cable 80 is maintained free of rotational motion. As shown in FIG. 3a, sail 82 may be cup-shaped and is offset from the base 88 to keep it headed into the wind without undue rotation.

The analysis of such a system is identical to that described for the FIG. 1 embodiment. As shown, it operates as an effective wind driven pump in the first mode of resonance. Depending on the tension in the cable the settings for adjustment and the physical properties of the cable, higher modes may be used.

A variation of the oscillating cable is shown in FIG. 4 which is a single blade unisail oscillating from side to side as the pitch angle is changed (see FIG. 4a) either quasi-sinusoidally or at the end of each stroke. As previously pointed out, the oscillatory systems experience an oscillating lift force variation which is roughly 90° out of phase with their motion and occurs when the resonant frequency is close to the Strouhal frequency. However, devices in accordance with this invention need not follow these constraints if flow conditions are altered to suit design requirements. Hence, in the case of FIG. 4, the cylindrical cable is replaced by an airfoil shape having a sharp trailing edge and variable angle of attack in accordance with the Kutta-Joukowski condition.

As shown in FIGS. 4 and 4a a single aerodynamic element 110 is shown mounted for movement about pivot pin (or torque bar if a resonant system is used) 112. The usable output is taken from the system on arm 114 in the form of a reciprocating motion shown by arrow 116. The element 110 and pin 112 are mounted on a base 118 at some location to optiminimize exposure to wind. Element 110 varies pitch by rotation about sleeve 120 in response to pitch arm 122 which is linked to the oscillatory motion of the base (linkage not shown) to effectuate changes in blade pitch angle.

As shown in FIG. 4a, the aerodynamic element 110 is initially oriented at an angle to the true wind and maintains this orientation until reaching a limit of travel when the pitch is reversed and the oscillation continues in the opposite direction. The theory of operation of such a unisail device is analogous to the theroy of binary flutter (coupled torsion and flap) and a detailed analysis need not be presented. Such a system offers material advantages over prior art windmill configurations. The expensive tower of a conventional windmill is eliminated and particularly in large applications the initial costs may be less than for a conventional windmill. Also this system can provide constant operating speeds regardless of wind speed by the use of automatic feathering techniques and in particularly high winds can be either furied or dismounted.

When mounted on a rotating platform, the device will follow aximuth shifts in wind direction automatically without need for a wind vane. Additionally, the use of an aerodynamic element balanced about a pin obviates many size limitations present in conventional windmill systems and peak stresses are governed by the power taken from the element. This later condition appears to be the limiting factor because transient pitch change (feathering) permits very high force loadings near the stroke limits. The attainable efficiency values will depend on the level of sophistication built into the aerodynamic element and particularly the limits of oscillation efficiency. The straight lines on the graph of FIG. 7 show the power potentially available at sea level as a function of sea level and span of the element 110.

A variation of the oscillating aerodynamic wing is shown in FIGS. 5 and 5a where the principle change is that there is no angle of attack variation but rather, circulation is controlled by blowing pressurized air supplied by an internal fan. The oscillating member 130 is mounted for movement on pin 132 with the usable power output extracted from the system by linkage to arm 134. The extent of movement is shown by arrow 136. Instead of varying the pitch of the member 130, circulation control is maintained by techniques pioneered at the (British) National Gas Turbine Establishment. A top plate or fairing to seal the end of member 130 is not shown. As shown in FIG. 5a, the member 130 is a hollow cylinder with internal supports 136 and 138. A pair of blowing slots 140 and 142 are disposed on the downwind side of the cylinder 130. A pendulous valve 144 is mounted for rotation on shaft 146 and the limit of travel is restricted by stops 148 and 150. A supply of pressurized air is introduced into the column 130 by a source, not shown, through holes 152 in pin 132. As the cylinder oscillates from left to right, the valve 144 will be in a position as shown in FIG. 5a closing outlet 140 such that pressurized gas can escape through outlet 142. The escape of gas serves to accelerate the oscillations and maintain boundary layer control over the trailing edge of the cylinders to continuously maintain the flow in a turbulent mode across the trailing edge thereby performing the same function as pitch control. When the cylinder reaches the limit of oscillation to the right, the pendulous valve 144 is thrown over to the right covering the outlet 142 and movement to the left begins with outlet 140 now discharging pressurized air.

The source of pressurized gas (not shown) can obviously be driven by the oscillating cylinder windmill itself with some of the generated power tapped for this purpose. Alternatively, a fixed supply can be used and replaced at appropriate intervals.

It is to be understood that the above-described embodiments are merely illustrative of numerous and varied other arrangements which form applications of the principles of the invention. Other embodiments may readily by devised by those skilled in the art without departing from the spirit and scope of the invention.

What is claimed is:

1. Apparatus for generating energy from a source of fluid in motion comprising:
   means disposed in said fluid for oscillating in response to the dynamic forces of the motion of the fluid moving past it, said means comprising a flexible cylindrical cable; and
   means operably coupled to said oscillating means for converting said oscillations into usable energy, said converting means comprising at least a pair of permanent magnets located on either side of the flexible cable and perpendicular to the oscillations of said cable.

2. The apparatus of claim 1 further comprising means for orienting said converting means into alignment with said fluid flow.

3. The apparatus of claim 2 wherein said means for orienting comprises a streamlining fairing on said magnets, and pivot means for allowing said magnets to turn in response to variations in the direction of fluid flow.

4. Apparatus for generating energy from a source of fluid in motion comprising:
   means disposed in said fluid for oscillating in response to the dynamic forces of the motion of the fluid moving past it, said means comprising a flexible cylindrical cable ;
   means operably coupled to said oscillating means for converting said oscillations into usable energy, said converting means including a diaphragm pump operably connected to said oscillating cable
   means to adjust the tension in said oscillating cable; and
   a sensor responsive to changes in the velocity of said moving fluid, said sensor connected to said means to adjust the tension of said oscillating cable.

5. The apparatus of claim 4 wherein said sensor comprises a series of anenometer cups.

6. The apparatus of claim 4 wherein said sensor includes a vane freely rotatable to maintain an orientation substantially perpendicular to the direction of said moving fluid, said vane being mounted for deflection in response to variations in velocity of said fluid, said vane being operably coupled to said cable to tension the cable in response to deflections of said vane.

7. The apparatus of claim 6 wherein one end of said cable is mounted on a pivot means to prevent the twisting of said cable when said vane rotates in response to changes in direction of said fluid flow.

* * * * *